US012719615B2

(12) United States Patent
He et al.

(10) Patent No.: US 12,719,615 B2
(45) Date of Patent: Aug. 25, 2026

(54) TECHNOLOGIES FOR HYBRID AUTOMATIC REPEAT REQUEST ACKNOWLEDGEMENT CODEBOOKS IN PHYSICAL UPLINK CONTROL CHANNEL TRANSMISSIONS

(71) Applicant: Apple Inc., Cupertino, CA (US)

(72) Inventors: Hong He, San Jose, CA (US); Chunxuan Ye, San Diego, CA (US); Dawei Zhang, Saratoga, CA (US); Haitong Sun, Saratoga (CA); Seyed Ali Akbar Fakoorian, San Diego, CA (US); Sigen Ye, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

(*) Notice: Subject to any disclaimer, the term of this patent is extended or adjusted under 35 U.S.C. 154(b) by 576 days.

(21) Appl. No.: 17/909,325

(22) PCT Filed: Sep. 24, 2021

(86) PCT No.: PCT/CN2021/120394
§ 371 (c)(1),
(2) Date: Sep. 2, 2022

(87) PCT Pub. No.: WO2023/044777
PCT Pub. Date: Mar. 30, 2023

(65) Prior Publication Data
US 2024/0204919 A1 Jun. 20, 2024

(51) Int. Cl.
*H04L 1/1812* (2023.01)
*H04L 1/1867* (2023.01)

(52) U.S. Cl.
CPC .......... *H04L 1/1816* (2013.01); *H04L 1/1887* (2013.01); *H04L 1/1896* (2013.01)

(58) Field of Classification Search
CPC ... H04L 1/1816; H04L 1/1887; H04L 1/1896; H04L 1/1854; H04L 1/1864; H04L 1/189
See application file for complete search history.

(56) References Cited

U.S. PATENT DOCUMENTS

2018/0042015 A1* 2/2018 Yin ...................... H04W 72/23
2020/0106569 A1* 4/2020 Tsai ...................... H04W 72/23
(Continued)

FOREIGN PATENT DOCUMENTS

CN 104685816 A 6/2015
CN 107517096 A 12/2017
(Continued)

OTHER PUBLICATIONS

Enhanced One-Shot HARQ Codebook Transmission, Ericcson, Jul. 29, 2020, Yufei Blakenship (Year: 2020).*
(Continued)

*Primary Examiner* — Ian N Moore
*Assistant Examiner* — Latresa A McCallum
(74) *Attorney, Agent, or Firm* — Kilpatrick Townsend & Stockton LLP

(57) ABSTRACT

Provided is a method for a user equipment (UE). The method comprises receiving a downlink control information (DCI) that indicates a physical uplink control channel (PUCCH) occasion retransmission; and performing retransmission for the PUCCH occasion and HARQ-ACK codebook associated with the PUCCH occasion based on the received DCI.

24 Claims, 13 Drawing Sheets

(56) References Cited

U.S. PATENT DOCUMENTS

| | | | | |
|---|---|---|---|---|
| 2020/0145143 | A1* | 5/2020 | Nemeth | H04L 1/1819 |
| 2020/0267597 | A1* | 8/2020 | Huang | H04L 1/1812 |
| 2021/0014026 | A1* | 1/2021 | Papasakellariou | H04L 1/1861 |
| 2021/0050955 | A1* | 2/2021 | Park | H04B 7/0456 |
| 2021/0099956 | A1* | 4/2021 | Nam | H04W 52/0235 |
| 2021/0105102 | A1 | 4/2021 | Li et al. | |
| 2021/0168762 | A1 | 6/2021 | Huang et al. | |
| 2021/0258102 | A1* | 8/2021 | Yang | H04L 1/1854 |
| 2021/0297190 | A1 | 9/2021 | Baldemair et al. | |
| 2022/0103299 | A1* | 3/2022 | Sun | H04L 1/189 |
| 2022/0322386 | A1* | 10/2022 | Bhatoolaul | H04L 1/1887 |
| 2022/0330307 | A1* | 10/2022 | Korhonen | H04L 1/1854 |
| 2023/0283415 | A1* | 9/2023 | Blankenship | H04L 1/1854 370/329 |
| 2024/0305433 | A1* | 9/2024 | Bae | H04L 1/1854 |

FOREIGN PATENT DOCUMENTS

| | | | |
|---|---|---|---|
| CN | 112106316 | A | 12/2020 |
| CN | 112313897 | A | 2/2021 |
| CN | 112398631 | A | 2/2021 |
| CN | 112997438 | A | 6/2021 |
| WO | 2020205728 | A1 | 10/2020 |

OTHER PUBLICATIONS

Juha Korhonen; "Indication of HARQ-ACK Codebook for Retransmission"; Apr. 8, 2021; (Year: 2021).*

HARQ Enhancement, 3GPP TSG-RAN WG1 Meeting #100bis-e, R1-2002690, Apr. 20-30, 2020, pp. 1-9.

International Patent Application No. PCT/CN2021/120394, International Search Report and Written Opinion, Mailed on Jun. 22, 2022, 9 pages.

3rd Generation Partnership Project; Technical Specification Group Radio Access Network; NR; Physical layer procedures for control (Release 16), 3GPP TS 38.213 V16.6.0, Jun. 2021, 187 pages.

Enhanced Industrial Internet of Things (IoT) and URLLC support, Nokia, Nokia Shanghai Bell, 3GPP TSG RAN Meeting #86, RP-193233, Dec. 9-12, 2019, 5 pages.

International Patent Application No. PCT/CN2021/120394, International Preliminary Report on Patentability, Apr. 4, 2024, 6 pages.

China Patent Application No. 202180020602.1, Office Action, May 21, 2025, 26 pages.

China Patent Application No. 202180020602.1, Notice of Decision to Grant, Jan. 19, 2026, 7 pages.

* cited by examiner

TECHNOLOGIES FOR HYBRID AUTOMATIC REPEAT REQUEST ACKNOWLEDGEMENT CODEBOOKS IN PHYSICAL UPLINK CONTROL CHANNEL TRANSMISSIONS

CROSS REFERENCE TO RELATED APPLICATION

This application is a 371 U.S. National Phase of PCT International Patent Application No. PCT/CN2021/120394, filed Sep. 24, 2021, which is herein incorporated by reference in its entirety for all purposes.

TECHNICAL FIELD

This application relates generally to wireless communication systems, and more specifically to a method and an apparatus for hybrid automatic repeat request (HARQ) acknowledgement (HARQ-ACK)/physical uplink control channel (PUCCH) occasion retransmission.

BACKGROUND

Wireless mobile communication technology uses various standards and protocols to transmit data between a base station and a wireless mobile device. Wireless communication system standards and protocols can include, but not limited to, the 3rd Generation Partnership Project (3GPP) long term evolution (LTE); fifth-generation (5G) 3GPP new radio (NR) standard; technologies beyond 5G. In fifth generation (5G) wireless RANs, RAN Nodes can include a 5G Node, new radio (NR) node or g Node B (gNB), which communicates with a wireless communication device, also known as user equipment (UE).

Recent studies on the enhancement for the HARQ-ACK have come to an agreement to support retransmission of the cancelled HARQ-ACK. Further details are still under discussion for enabling the efficient HARQ-ACK CB/PUCCH occasion retransmission.

SUMMARY

According to an aspect of the present disclosure, a method for a user equipment (UE) is provided that comprises: receiving a downlink control information (DCI) that indicates a physical uplink control channel (PUCCH) occasion retransmission; and performing retransmission for the PUCCH occasion and HARQ-ACK codebook associated with the PUCCH occasion based on the received DCI.

According to an aspect of the present disclosure, a method for a base station is provided that comprises: constructing, a downlink control information (DCI) that indicates a physical uplink control channel (PUCCH) occasion retransmission for the UE; and providing the DCI for the UE to trigger the PUCCH occasion retransmission.

According to an aspect of the present disclosure, an apparatus for a user equipment (UE) is provided that comprises one or more processors configured to perform steps of the method as describe above.

According to an aspect of the present disclosure, an apparatus for a base station is provided that comprises one or more processors configured to perform steps of the method as describe above.

According to an aspect of the present disclosure, a computer readable medium having computer programs stored thereon is provided, which, when executed by one or more processors, cause an apparatus to perform steps of the method as describe above.

According to an aspect of the present disclosure, an apparatus for a communication device is provided that comprises means for performing steps of the method as describe above.

According to an aspect of the present disclosure, a computer program product comprising computer programs which, when executed by one or more processors, cause an apparatus to perform steps of the method as describe above.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

Figure 1:
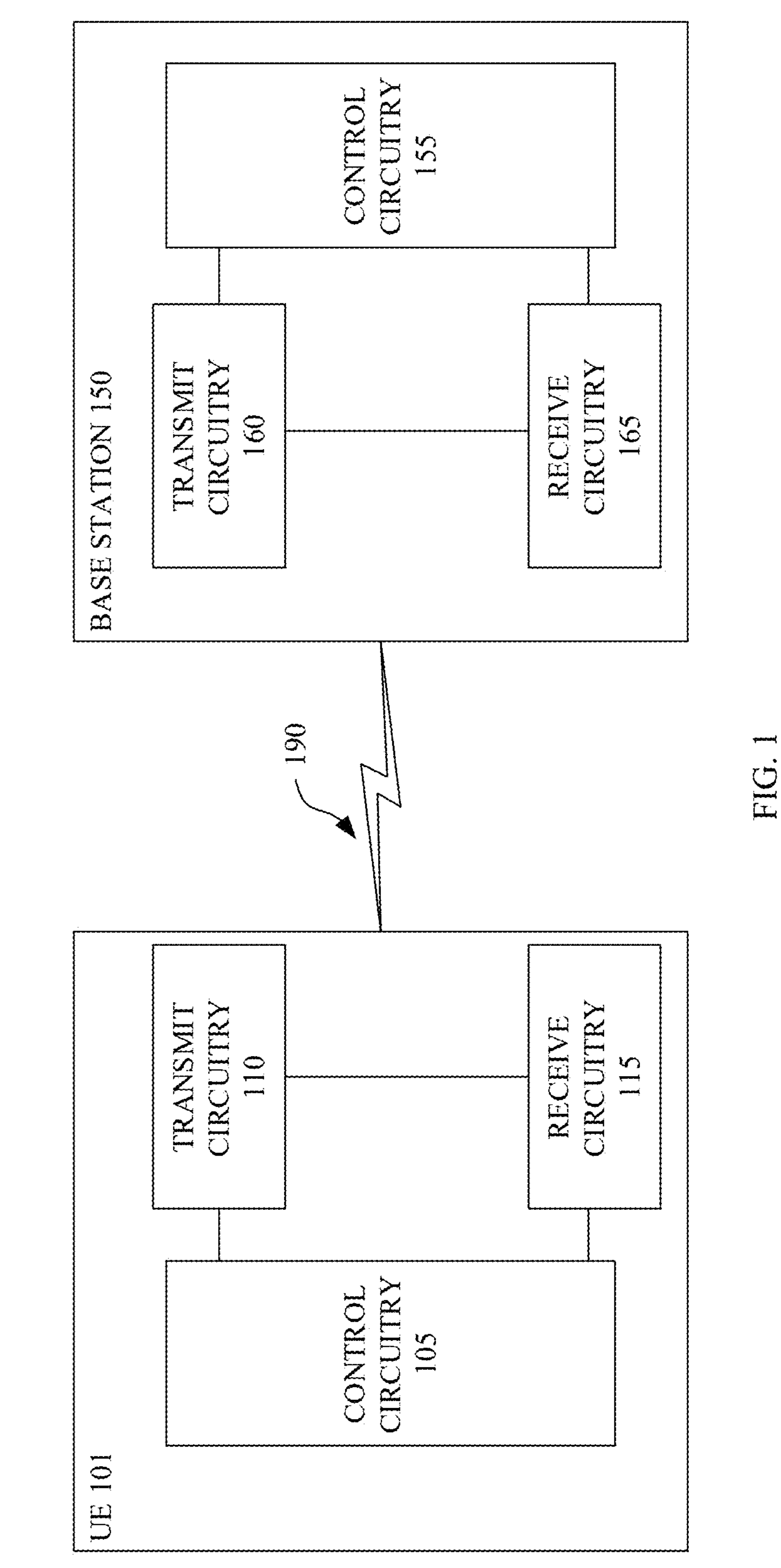
FIG. 1 is a block diagram of a system including a base station and a user equipment (UE) in accordance with some embodiments.

FIG. 1 is a block diagram of a system including a base station and a user equipment (UE) in accordance with some embodiments. FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 may provide network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

The UE and various base stations to be described in the following embodiments may be implemented by the UE 101 and the base station 150 as described in FIG. 1.

Figure 2:
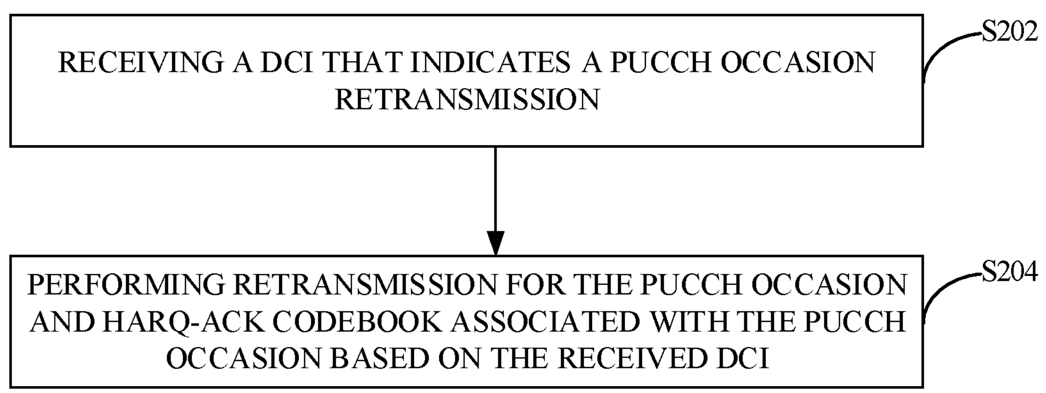
FIG. 2 illustrates a flow chart for an exemplary method for a UE in accordance with some embodiments.

FIG. 2 illustrates a flow chart for an exemplary method for a UE in accordance with some embodiments. The method 200 illustrated in FIG. 2 may be implemented by the UE 101 as described in FIG. 1.

As shown in FIG. 2, The method 200 for the UE may include the following steps: S202, receiving a downlink control information (DCI) that indicates a physical uplink control channel (PUCCH) occasion retransmission; and performing retransmission for the PUCCH occasion and HARQ-ACK codebook associated with the PUCCH occasion based on the received DCI.

In some embodiments, the DCI may include a PUCCH slot indicator (PSI) field, a one-shot hybrid automatic repeat request (HARQ) acknowledgement (HARQ-ACK) request field and a PUCCH priority indicator (PPI) field.

PSI Field

For DCI format 1_2, a new field 'PSI' maybe added to the existing fields of the DCI format 1_2.

In some embodiments, the value of PSI field is one-to-one mapping to values of parameter $K_3$ that is configured by radio resource control (RRC) signaling.

The parameter $K_3$ may have at least one value and the PSI field indicates one of the at least one value.

For example, each of the at least one value of $K_3$ may have an index, and the PSI field may indicate the index so that it is mapped to $K_3$.

The UE may be first configured with a set of numbers of slots or sub-slots $K_3$. The maximum value among the at least one value of $K_3$ may be reported as part of the UE capability.

In some embodiments, a bit width for the PSI field may be determined as $\lceil \log_2(I) \rceil$, where I represents the number of the at least one value of $K_3$ parameter values configured by RRC signaling.

As an example, if a single value is configured for $K_3$, then the PSI field is 0 bit, i.e., not present.

In some embodiments, in some designs, a plurality of the PSI fields may be included in the DCI (i.e., DCI format 1_2) to support a plurality of the PUCCH occasion retransmissions that are triggered by a DCI.

In addition to the above described one-to-one mapping format for the PSI field, an alternative format may be applied as follows.

In some embodiments, the PSI field may be formed as a I-bit bitmap, where I represents the number of $K_3$ parameter values, and each bit in the I-bit bitmap corresponds to one of the values of $K_3$ parameter.

Comparing with the above described one-to-one mapping format, this bitmap format can support more than one HARQ-ACK CBs/PUCCH occasions that can be retransmitted in a PUCCH slot.

The physical meaning as to the parameter $K_3$ may be further understood from the following aspects.

In some embodiments, at the step S204, the performing the PUCCH occasion retransmission based on the DCI may comprise: upon detection of a DCI in a slot n that triggers a PUCCH occasion retransmission, where n represents an index of the slot, performing retransmissions for the PUCCH occasion indicated by the DCI and the corresponding HARQ-ACK codebook (CB) transmitted on the PUCCH occasion in a slot n-$K_3$ where $K_3$ is indicated by the DCI.

For example, if the UE detects DCI associated with DCI 2_1 format including a one-shot HARQ-ACK request field with a value '1' in the slot n, the UE may retransmit the HARQ-ACK CB transmitted on a PUCCH occasion in a slot or sub-slot n-$K_3$ in a separate PUCCH slot that is indicated by the DCI format 2_1.

In some embodiments, at the step S204, the performing the PUCCH occasion retransmission based on the DCI may comprise: performing the PUCCH occasion retransmission in a target PUCCH occasion, to which an initial PUCCH occasion for the PUCCH occasion retransmission has a slot gap corresponding to the value of $K_3$.

In other words, the value of the parameter $K_3$ may be defined as a gap between a slot of a retransmitted HARQ-ACK CB/PUCCH occasion and a slot where the a new target PUCCH is scheduled by the triggering DCI format to convey the retransmitted HARQ-ACK CB in the retransmitted PUCCH occasion.

One-Shot HARQ-ACK Request Field

In some embodiments, the one-shot HARQ-ACK request field may be set to 1-bit and used to trigger a retransmission for the HARQ-ACK CB carried on the retransmitted PUCCH occasion indicated by the DCI.

PPI Field

In some embodiments, the PPI field may be set to 1-bit.

In some embodiments, the PPI field may be configured to indicate a priority of a retransmitted PUCCH.

The PPI field may be used to mitigate a potential misalignment between the gNB and the UE regarding the HARQ-ACK codebook to be retransmitted.

The PPI field in the triggering DCI format 1_2 may be used to indicate the priority value of the retransmitted PUCCH. With this option, the PUCCH retransmission may be limited to be triggered by the PDCCH that schedules PDSCH with a same priority.

More details as to this aspect will be further described with reference to FIG. 4.

In some embodiments, instead of using the PPI field, a priority of a retransmitted PUCCH occasion may be appended to a predefined location of a retransmitted HARQ-ACK payload, e.g., to the end of the retransmitted HARQ-ACK CB.

Figure 3:
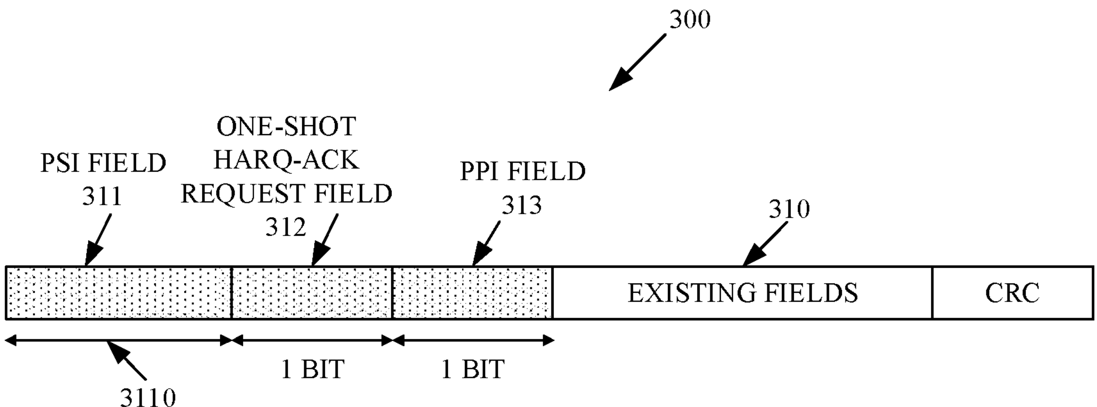
FIG. 3 illustrates an example of an enhanced DCI format 1_2 for PUCCH occasion retransmission in accordance with some embodiments.

FIG. 3 illustrates an example of an enhanced DCI format 1_2 for the PUCCH occasion retransmission in accordance with some embodiments.

As shown in FIG. 3, the enhanced DCI format 1_2 300 may include a PUCCH slot indicator (PSI) field 311, a one-shot HARQ-ACK request field 312 and a PUCCH priority indicator (PPI) field 313, in addition to the existing fields 310 of the DCI format 1_2 300.

Each of the one-shot HARQ-ACK request field 312 and the PPI field 313 may have a bit width of 1 bit. As described above, the bit width 3110 of the PSI field 311 may be determined as $\lceil \log_2(I) \rceil$, where I represents the number of the at least one value of $K_3$. For example, if $K_3$ has four different values, then the PSI field 311 may have a bit width of 2 bits.

Figure 4:
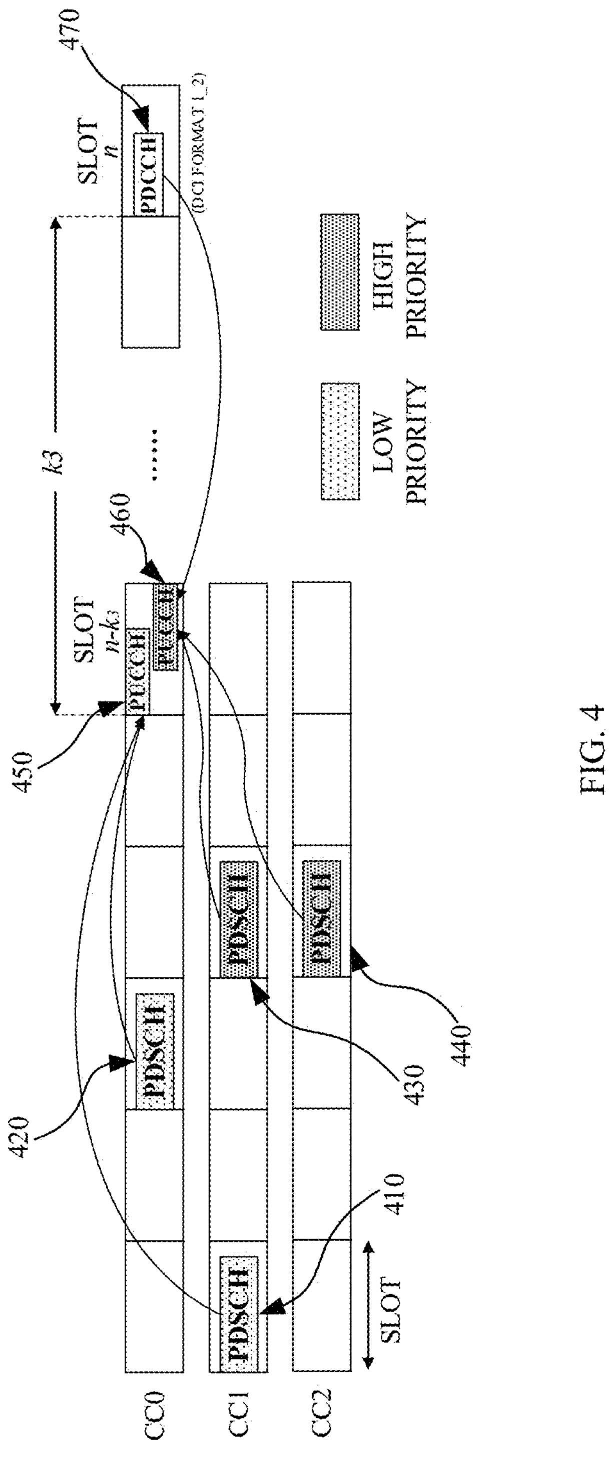
FIG. 4 illustrates an example case in which a PUCCH priority indicator (PPI) field is adopted in accordance with some embodiments.

FIG. 4 illustrates an example case in which the PPI field is adopted in accordance with some embodiments.

As shown in FIG. 4, an example of the HARQ-ACK CB mis-alignment problem and how it can be solved by introducing the PPI field is explained.

For ease of explanation of the HARQ-ACK CB mis-alignment problem, a certain assumption may be made with reference to FIG. 4.

It is assumed that four PDSCHs, i.e., PDSCHs 410 and 420 of a low priority and PDSCHs 430 and 440 of a higher priority than the PDSCHs 410 and 420, are scheduled on different component carriers (CCs) (CC0 to CC2 as shown) for the UE. Accordingly, both of the two PUCCHs 450 and 460 are expected by the gNB to be transmitted by the UE for the scheduled PDSCHs 410 to 440.

However, it is assumed that at the UE side, PDCCHs that schedule the PDSCH 430 and 440 are missed, and consequently the UE fails to transmit the PUCCH 460. Meanwhile, the UE detects the PDSCHs 410 and 420 of the low priority and thus transmits the associated PUCCH 450, which is missed at the gNB side.

In a case that the PPI field is not included, the UE may mis-interpret that the DCI format 1_2 (via a PDCCH 470) in a slot n requests to retransmit the PUCCH 450, which is transmitted by the UE in the slot n-$K_3$. However, the gNB may interpret that the retransmitted HARQ-ACK CB is associated with the PUCCH 460 in the slot n-$K_3$. Thus, the HARQ-ACK CB mis-alignment problem occurs.

This problem can be solved by indicating the priority of the PUCCH via the PPI field by setting the value as '1'. Accordingly, the UE would not transmit anything, i.e., DTX. Based on the detection result of the retransmitted PUCCH 460 in the slot n-$K_3$, the gNB knows that the PDSCHs 430 and 440 are missed at the UE side and therefore these PDSCHs are retransmitted in a timely manner.

Back to FIG. 1 again, an implicit HARQ-ACK CB dropping operation is provided according to the disclosure.

In some embodiments, at the step S204, the performing the PUCCH occasion retransmission based on the DCI may comprise: upon detection of a triggering in a slot n indicating to perform the PUCCH occasion retransmission for the PUCCH in a slot n-$K_3$, where n represents an index of the slot, discarding an HARQ-ACK CB that is transmitted in a slot earlier than the slot n-$K_3$.

In other words, if the UE receives DCI format 2_1 in a slot n that triggers retransmission of a PUCCH occasion in a slot n-$K_3$ with a certain priority, the UE may discard the HARQ-ACK feedback for the PDSCHs that are transmitted in slots earlier than the slot n-$K_3$. In this way, the HARQ-ACK CB buffering can be minimized.

This aspect will be further described with reference to FIG. 5 below.

Figure 5:
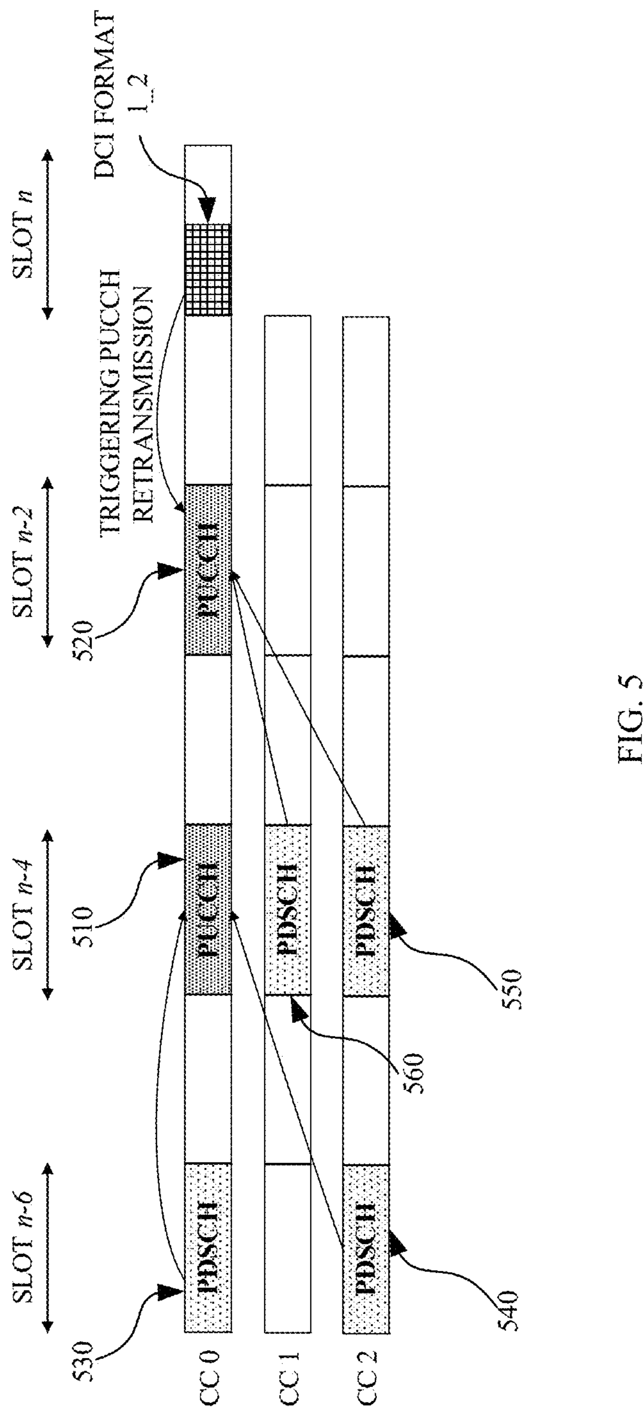
FIG. 5 illustrates a schematic diagram for an example of implicit HARQ-ACK CB dropping operation in accordance with some embodiments.

FIG. 5 illustrates a schematic diagram for an example of implicit HARQ-ACK CB dropping operation in accordance with some embodiments.

As an example, FIG. 5 illustrates three CCs, i.e., CC0, CC1 and CC2. PDSCHs 530 and 540 are transmitted in a slot n−6 on the CC0 and CC2, respectively. The associated HARQ-ACK CB is transmitted on PUCCH 510 in a slot n−4. Additionally, PDSCHs 550 and 560 are scheduled by the gNB as being transmitted in the slot n−4 on the CC2 and CCT, respectively. The associated HARQ-ACK CB is scheduled over PUCCH 520 in a slot n−2.

Assuming that the PUCCH 510 in the slot n−4 is successfully decoded at the gNB side, while a decoding failure happens to the PUCCH 520 in the slot n−2. In this case, the PSI field in DCI format 1_2 in the slot n may be set to indicate to retransmit the PUCCH 520. Accordingly, the UE may discard the PUCCH 510 if the PUCCHs 510 and 520 are in a same priority. As such, the HARQ-ACK CB buffering can be minimized.

Back to FIG. 1 again, in some embodiments, a variety of approaches can be considered for setting of a counter downlink assignment indicator (C-DAI) and a total downlink assignment indicator (T-DAI) fields in DCI format 1_2 that triggers PUCCH occasion retransmission, when a Type 2 HARQ-ACK CB is configured for the UE.

In some embodiments, wherein the C-DAI field and the T-DAI field in the DCI triggering a PUCCH occasion retransmission are continuously accumulated based on the value of C-DAI field and the value of T-DAI field in the last DCI that is associated with the retransmitted PUCCH occasion.

This aspect will be further described with reference to FIG. 6 below.

Figure 6:
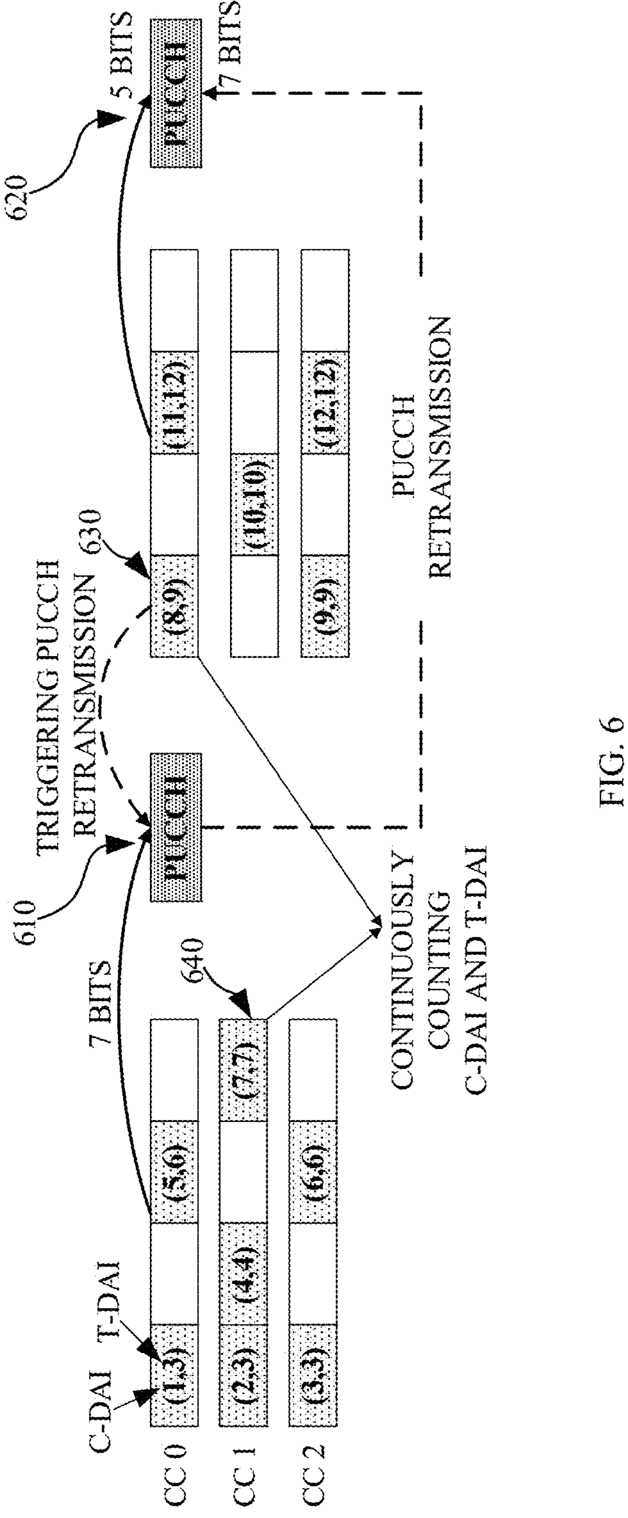
FIG. 6 illustrates a schematic diagram for an example of C-DAI and T-DAI setting of DCI format 12 for Type 2 HARQ-ACK CB/PUCCH occasion retransmission.

FIG. 6 illustrates a schematic diagram for an example of the C-DAI and T-DAI setting of DCI format 1_2 for Type 2 HARQ-ACK CB/PUCCH occasion retransmission.

As shown in FIG. 6, it is assumed that seven PDSCHs (as depicted by shadowed blocks with C-DAI and T-DAI numbers in FIG. 6) were scheduled with properly setting <C-DAI, T-DAI> pairs in scheduling DCI, and the associated HARQ-ACK CB is carried by PUCCH 610. At the gNB side, however, a decoding failure occurs for the PUCCH 610.

Accordingly, the gNB triggers retransmission for PUCCH 610 by setting <C-DAI, T-DAI>=<8,9> in DCI format 1_2 630, which is continuously counted the C-DAI and T-DAI based on that in the last DCI format 1_2 640 that is associated with the PUCCH 610.

The UE is additionally scheduled four PDSCH receptions with <C-DAI, T-DAI> being set as <9,9>,<10,10>,<11,12> and <12,12>. Consequently, 12 HARQ-ACK bits in total is transmitted over PUCCH 620, including 7 bits for the retransmitted HARQ-ACK CB and 5 bits for the initial HARQ-ACK bits for the newly scheduled PDSCHs.

In some embodiments, the C-DAI field and the T-DAI field in the DCI triggering a PUCCH occasion retransmission are reset and counted independently, regardless of values of the C-DAI field and the T-DAI field in the last DCI of a retransmitted PUCCH.

In some embodiments, an additional T-DAI field is added to the DCI that triggers a PUCCH occasion retransmission to indicate the size of a retransmitted HARQ-ACK.

This is to ensure the reliability of the concatenated HARQ-ACK CB that includes both the new HARQ-ACK bits and the retransmitted HARQ-ACK CB.

This aspect will be further described with reference to FIG. 7 below.

Figure 7:
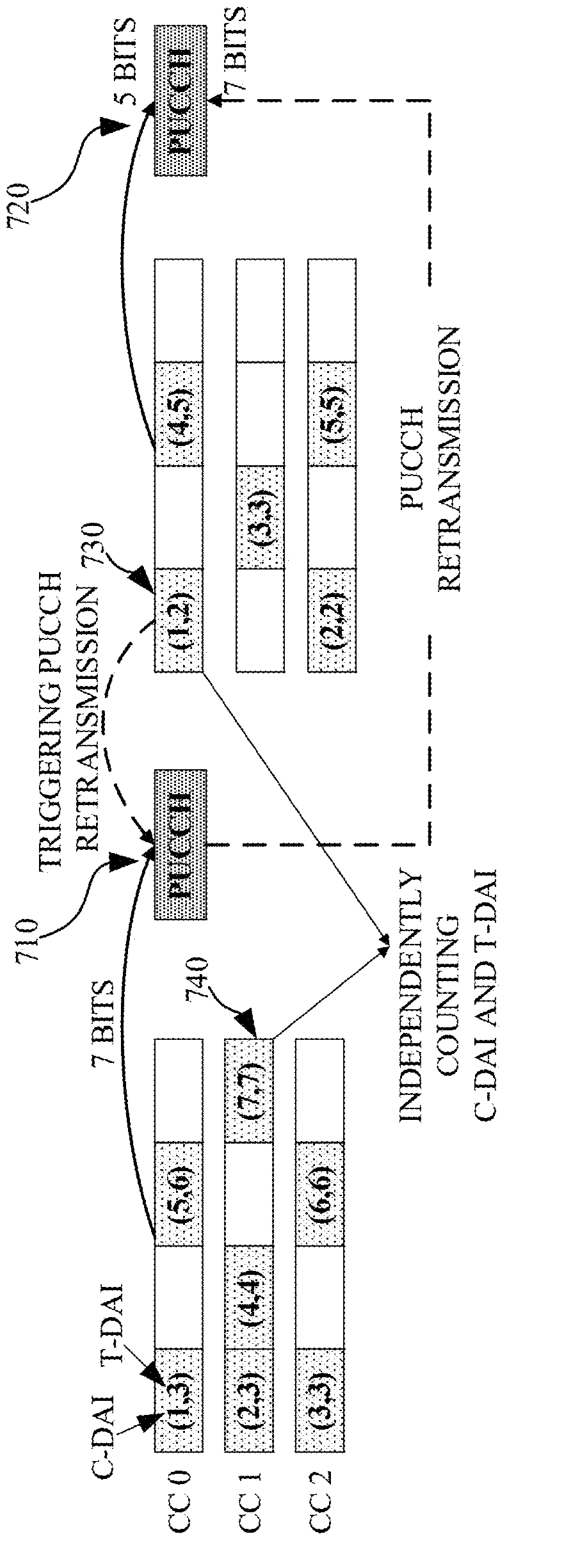
FIG. 7 illustrates a schematic diagram for another example of C-DAI and T-DAI setting for DCI format 1_2 for Type 2 HARQ-ACK CB/PUCCH occasion retransmission.

FIG. 7 illustrates a schematic diagram for another example of the C-DAI and T-DAI setting of DCI format 1_2 for Type 2 HARQ-ACK CB/PUCCH occasion retransmission.

As shown in FIG. 7, similar to FIG. 6, it was assumed that 7 PDSCHs and 5 PDSCHs (as indicated by the shadowed blocks with C-DAI and T-DAI numbers in FIG. 7) were scheduled on three CCs, i.e., CC0, CC1 and CC2. The associated HARQ-ACK CBs are carried by PUCCH 710 and PUCCH 720, respectively.

Assuming that the PUCCH 710 is missed by the gNB. In this embodiment, DCI format 1_2 730 may be transmitted by the gNB to trigger the retransmission for the PUCCH 710, where the <C-DAI, T-DAI> in the DCI format 1_2 730 is reset and re-counted, regardless of the value of the <C-DAI, T-DAI> in the last DCI format 1_2 740 that is associated with the PUCCH 710.

Back to FIG. 1 again, in some embodiments, the PUCCH occasion retransmission may be associated with a Type 1 HARQ-ACK CB. A variety of approaches maybe considered for Type 1 HARQ-ACK CB/PUCCH occasion retransmission.

In some embodiments, at the step S204, the performing the PUCCH occasion retransmission may comprise: appending an HARQ-ACK CB that is retransmitted in a slot n at the end of an initial HARQ-ACK CB that is associated with the slot n, according to a set of K1 values configured by RRC, where n represents an index of the slot.

This aspect will be further described with reference to FIG. 8 below.

Figure 8:
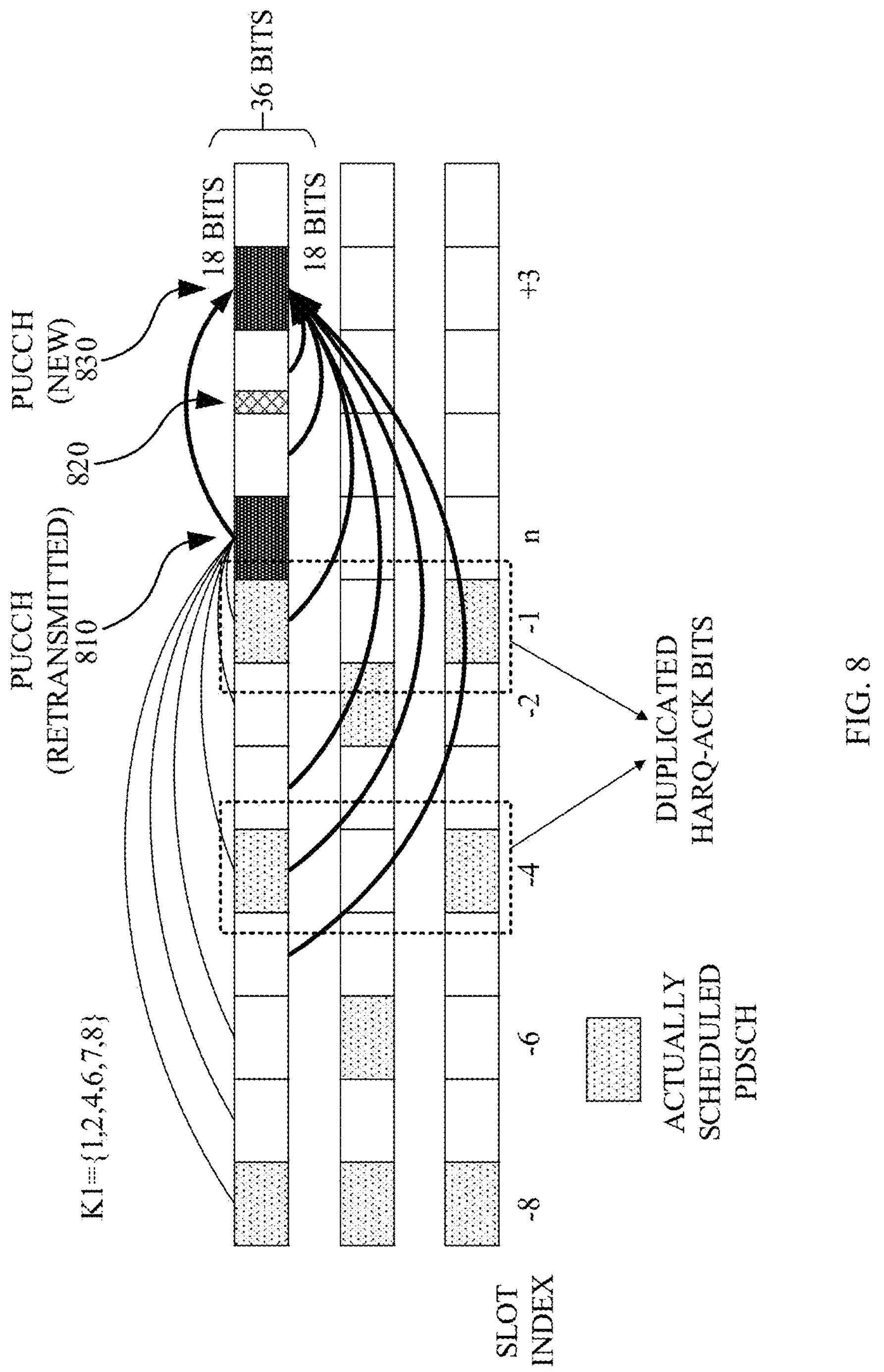
FIG. 8 illustrates a schematic diagram for an example of Type 1 HARQ-ACK CB/PUCCH occasion retransmission.

FIG. 8 illustrates a schematic diagram for an example of Type 1 HARQ-ACK CB/PUCCH occasion retransmission.

As shown in FIG. 8, by means of concatenating two HARQ-ACK CBs, in which one is for an initial HARQ-ACK CB in PUCCH 830 (18 bits) and the other one is for a retransmitted HARQ-ACK CB in PUCCH 810 (18 bits), a size of Type 1 HARQ-ACK CB in a slot n using PUCCH 830 would be doubled (i.e., increased to 36 bits as depicted in FIG. 8). Here, three CCs are assumed as an example.

Since the UE might miss the DCI format 1_2 820 that triggers retransmission of the HARQ-ACK CB that is originally scheduled in the PUCCH 810, the gNB may need to perform twice BDs for HARQ-ACK CB reception in the PUCCH 830 with different hypothesis assumptions, i.e, with and without detection of DCI format 1_2 820 at the UE.

This might result in an increase of the size of the HARQ-ACK CB in the slot n+3 using the PUCCH 830. As shown in FIG. 8, 6 HARQ-ACK bits that are associated with slots n−4 and n−1 are duplicated in the original HARQ-ACK CB and the retransmitted HARQ-ACK CB, leading to 6 bits of unnecessary overhead.

Nevertheless, this issue can be addressed by a further embodiment as described below, which will be illustrated with reference to FIG. 9.

In some embodiments, at the step S204, the performing the PUCCH occasion retransmission may comprise: excluding a duplicated HARQ-ACK bit existed in both an original HARQ-ACK CB and a retransmitted HARQ-ACK CB that is associated with a same DL slot index; and concatenating the original HARQ-ACK CB with the retransmitted HARQ-ACK CB.

In other words, to avoid the unnecessary overhead as illustrated in FIG. 8, the UE may exclude the duplicated HARQ-ACK feedback between the original HARQ-ACK CB and the retransmitted HARQ-ACK CB and then perform a concatenation operation of the original HARQ-ACK CB and the retransmitted HARQ-ACK CB.

This aspect will be further described with reference to FIG. 9 below.

Figure 9:
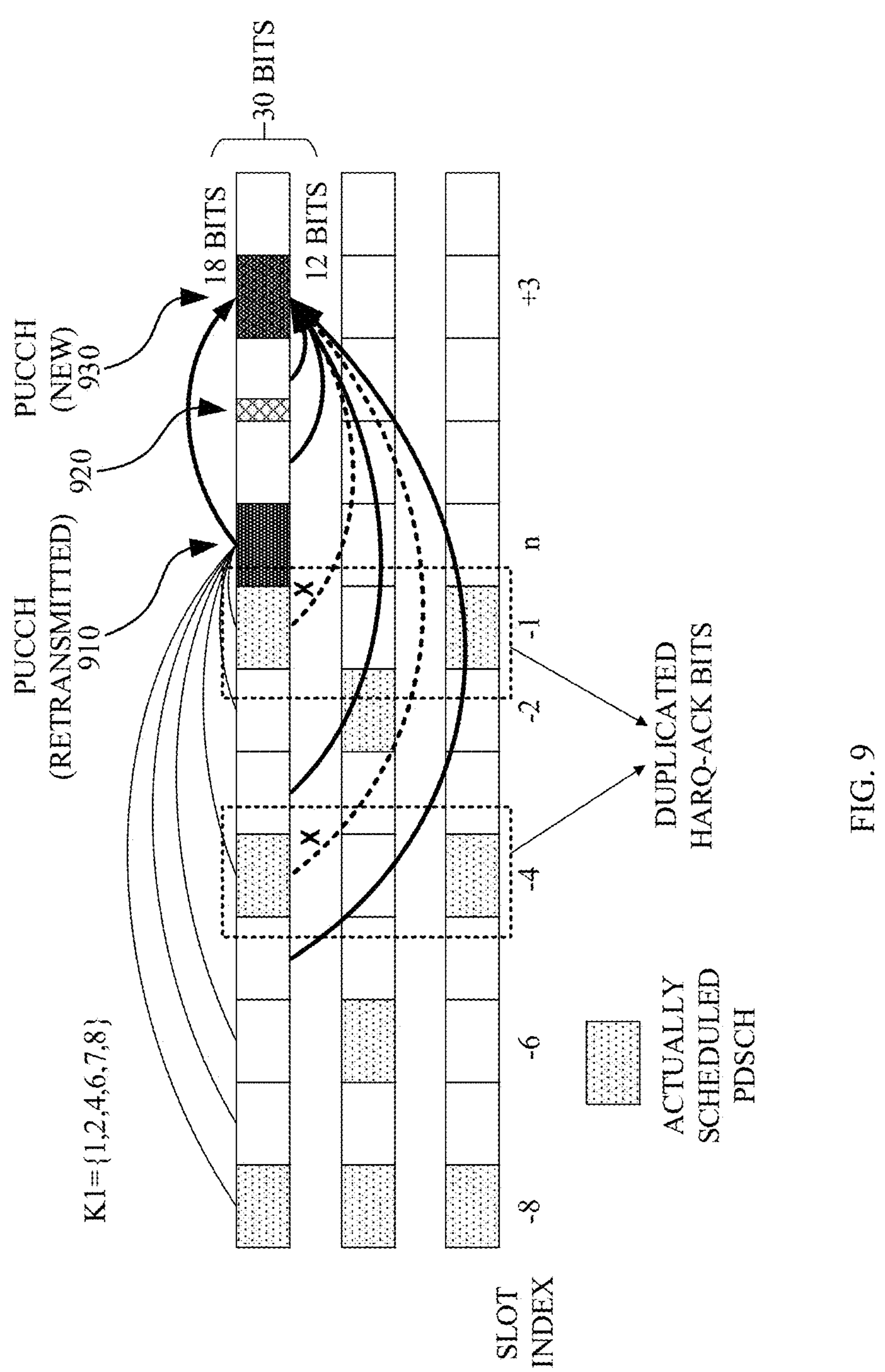
FIG. 9 illustrates a schematic diagram for another example of Type 1 HARQ-ACK CB/PUCCH occasion retransmission.

FIG. 9 illustrates a schematic diagram for another example of Type 1 HARQ-ACK CB/PUCCH occasion retransmission.

As shown in FIG. 9, in contrary to the embodiment shown in FIG. 8, the UE would exclude the slots n−4 and n−1 that have HARQ-ACK bits in both the original HARQ-ACK CB 930 and the retransmitted HARQ-ACK CB 910. DCI format 1_2 920 triggers retransmission of the HARQ-ACK CB that is originally scheduled in the PUCCH 910.

As such, the concatenated size of the HARQ-ACK CB over PUCCH in the slot n+3 is effectively reduced from 36 bits to 30 bits without any HARQ-ACK information loss.

In some embodiments, at the step S204, the performing the PUCCH occasion retransmission may comprise: transmitting a retransmitted HARQ-ACK CB on a PUCCH occasion indicated by the DCI that triggers a PUCCH occasion retransmission.

According to the disclosure, the HARQ-ACK CB/PUCCH occasion retransmission can be enabled efficiently with improved reliability performance.

Figure 10:
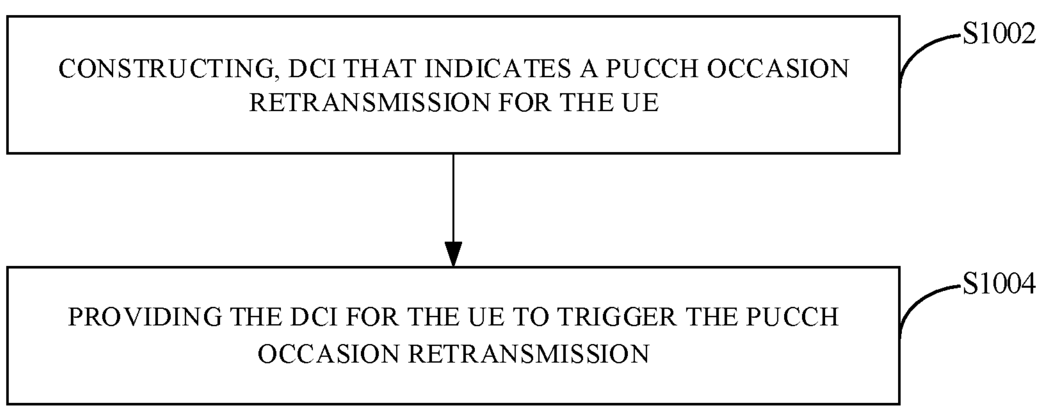
FIG. 10 illustrates a flow chart for an exemplary method for a base station in accordance with some embodiments.

FIG. 10 illustrates a flow chart for an exemplary method for a base station in accordance with some embodiments. The method 1000 illustrated in FIG. 10 may be implemented by the base station 150 as described in FIG. 1.

As shown in FIG. 10, The method 1000 for the base station may include the following steps: S1002, constructing, a downlink control information (DCI) that indicates a physical uplink control channel (PUCCH) occasion retransmission for the UE; and providing the DCI for the UE to trigger the PUCCH occasion retransmission.

In some embodiments, the DCI may include a PUCCH slot indicator (PSI) field, a one-shot hybrid automatic repeat request (HARQ) acknowledgement (HARQ-ACK) request field and a PUCCH priority indicator (PPI) field. Details as to each of the fields have been described with reference to FIGS. 2-4, and thus details are not repeated here.

In some embodiments, the PUCCH occasion retransmission may be associated with a Type 2 HARQ-ACK CB, and the DCI includes a counter downlink assignment indicator (C-DAI) field and a total downlink assignment indicator (T-DAI) field.

In this case, in some embodiments, at the step S1004, the providing the DCI for performing the PUCCH occasion retransmission may comprise: continuously accumulating the C-DAI field and the T-DAI field in the DCI triggering a PUCCH occasion retransmission based on the value of C-DAI field and the value of T-DAI field in the last DCI that is associated with a retransmitted PUCCH.

Alternatively, in some embodiments, at the step S1004, the providing the DCI for performing the PUCCH occasion retransmission may comprise: resetting and counting the C-DAI field and the T-DAI field in the DCI triggering a PUCCH occasion retransmission independently, regardless of values of the C-DAI field and the T-DAI field in the last DCI of a retransmitted PUCCH. In some embodiments, the providing the DCI for performing the PUCCH occasion retransmission may further comprise: adding an additional T-DAI field to the DCI that triggers a PUCCH occasion retransmission to indicate the size of a retransmitted HARQ-ACK.

Details as to these aspects have been described with reference to FIGS. 6-7, and thus details are not repeated here.

Figure 11:
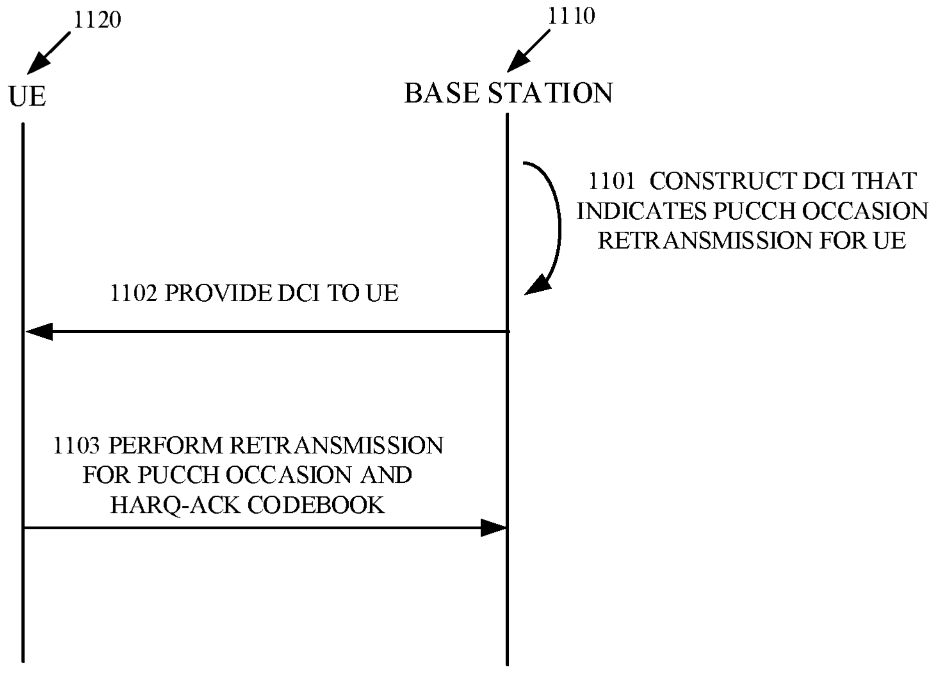
FIG. 11 illustrates a schematic diagram for an exemplary method between a UE and a base station in accordance with some embodiments.

FIG. 11 illustrates a schematic diagram for an exemplary method between a UE and a base station in accordance with some embodiments.

As shown in FIG. 11, the base station 1110 may construct 1101 DCI that indicates a physical uplink control channel (PUCCH) occasion retransmission for the UE, and may provide 1102 the DCI for the UE 1120 to trigger the PUCCH occasion retransmission.

Upon acquiring of the DCI, the UE 1120 may perform 1103 retransmission for the PUCCH occasion and HARQ-ACK codebook associated with the PUCCH occasion based on the received DCI.

According to a further aspect of the disclosure, an apparatus for a user equipment (UE) is provided that comprises one or more processors configured to perform steps of the method as describe above for the UE.

According to a further aspect of the disclosure, an apparatus for a base station is provided that comprises one or more processors configured to perform steps of the method as describe above for the base station.

According to a further aspect of the disclosure, a computer readable medium having computer programs stored thereon is provided, which, when executed by one or more processors, cause an apparatus to perform steps of the method as describe above.

According to a further aspect of the disclosure, an apparatus for a communication device is provided that comprises means for performing steps of the method as describe above.

According to a further aspect of the disclosure, a computer program product comprising computer programs which, when executed by one or more processors, cause an apparatus to perform steps of the method as describe above.

According to the disclosure, it is possible to achieve the CBG-based operation for the multiple-PDSCH scheduling with minimized DL/UL signaling overhead.

Figure 12:
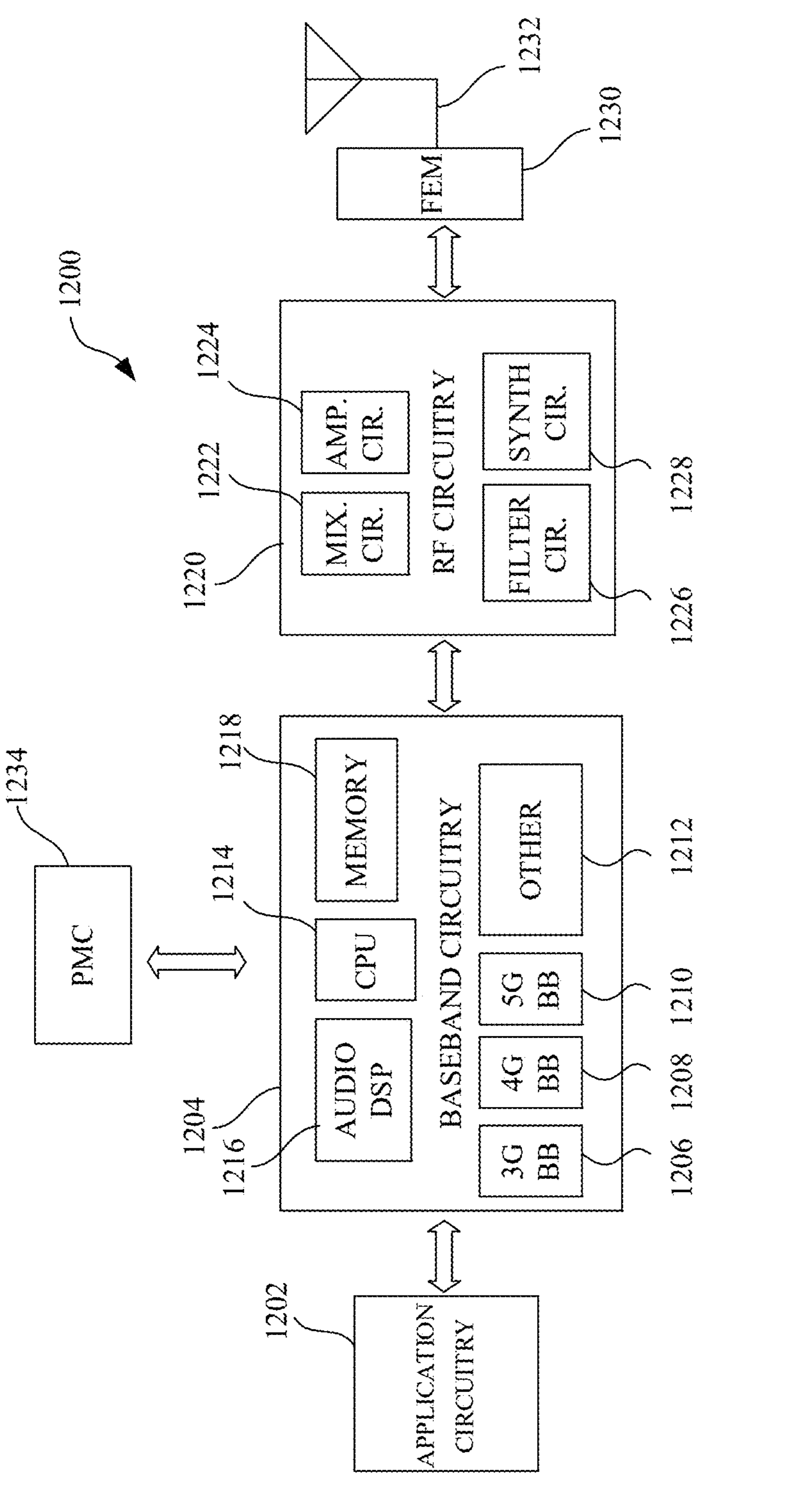
FIG. 12 illustrates a communication device (e.g., a UE or a base station) in accordance with some embodiments.

FIG. 12 illustrates a communication device (e.g., a UE or a base station) in accordance with some embodiments. FIG. 12 illustrates example components of a device 1200 in accordance with some embodiments. In some embodiments, the device 1200 may include application circuitry 1202, baseband circuitry 1204, Radio Frequency (RF) circuitry (shown as RF circuitry 1220), front-end module (FEM) circuitry (shown as FEM circuitry 1230), one or more antennas 1232, and power management circuitry (PMC) (shown as PMC 1234) coupled together at least as shown. The components of the illustrated device 1200 may be included in a UE or a RAN node. In some embodiments, the device 1200 may include fewer elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1220 and to generate baseband signals for a transmit signal path of the RF circuitry 1220. The baseband circuitry 1204 may interface with the application circuitry 1202 for generation and processing of the baseband signals and for controlling operations of the RF circuitry 1220. For example, in some embodiments, the baseband circuitry 1204 may include a third generation (3G) baseband processor (3G baseband processor 1206), a fourth generation (4G) baseband processor (4G baseband processor 1208), a fifth generation (5G) baseband processor (5G baseband processor 1210), or other baseband processor(s) 1212 for other existing generations, generations in development or to be developed in the future (e.g., second generation (2G), sixth generation (6G), etc.). The baseband circuitry 1204 (e.g., one or more of baseband processors) may handle various radio control functions that enable communication with one or more radio networks via the RF circuitry 1220. In other embodiments, some or all of the functionality of the illustrated baseband processors may be included in modules stored in the memory 1218 and executed via a Central Processing Unit (CPU 1214). The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include a digital signal processor (DSP), such as one or more audio DSP(s) 1216. The one or more audio DSP(s) 1216 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 1204 is configured to support radio communications of more than one wireless protocol may be referred to as multi-mode baseband circuitry.

The RF circuitry 1220 may enable communication with wireless networks using modulated electromagnetic radiation through a non-solid medium. In various embodiments, the RF circuitry 1220 may include switches, filters, amplifiers, etc. to facilitate the communication with the wireless network. The RF circuitry 1220 may include a receive signal path which may include circuitry to down-convert RF signals received from the FEM circuitry 1230 and provide baseband signals to the baseband circuitry 1204. The RF circuitry 1220 may also include a transmit signal path which may include circuitry to up-convert baseband signals provided by the baseband circuitry 1204 and provide RF output signals to the FEM circuitry 1230 for transmission. In some embodiments, the receive signal path of the RF circuitry 1220 may include mixer circuitry 1222, amplifier circuitry 1224 and filter circuitry 1226. In some embodiments, the transmit signal path of the RF circuitry 1220 may include filter circuitry 1226 and mixer circuitry 1222. The RF circuitry 1220 may also include synthesizer circuitry 1228 for synthesizing a frequency for use by the mixer circuitry 1222 of the receive signal path and the transmit signal path. In some embodiments, the mixer circuitry 1222 of the receive signal path may be configured to down-convert RF signals received from the FEM circuitry 1230 based on the synthesized frequency provided by synthesizer circuitry 1228. The amplifier circuitry 1224 may be configured to amplify the down-converted signals and the filter circuitry 1226 may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, the mixer circuitry 1222 of the receive signal path may comprise passive mixers, although the scope of the embodiments is not limited in this respect.

In some embodiments, the mixer circuitry 1222 of the transmit signal path may be configured to up-convert input baseband signals based on the synthesized frequency provided by the synthesizer circuitry 1228 to generate RF output signals for the FEM circuitry 1230. The baseband signals may be provided by the baseband circuitry 1204 and may be filtered by the filter circuitry 1226.

In some embodiments, the mixer circuitry 1222 of the receive signal path and the mixer circuitry 1222 of the transmit signal path may include two or more mixers and may be arranged for quadrature down conversion and up conversion, respectively. In some embodiments, the mixer circuitry 1222 of the receive signal path and the mixer circuitry 1222 of the transmit signal path may include two or more mixers and may be arranged for image rejection (e.g., Hartley image rejection). In some embodiments, the mixer circuitry 1222 of the receive signal path and the mixer circuitry 1222 may be arranged for direct down conversion and direct up conversion, respectively. In some embodiments, the mixer circuitry 1222 of the receive signal path and the mixer circuitry 1222 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1220 may include analog-to-digital converter (ADC) and digital-to-analog converter (DAC) circuitry and the baseband circuitry 1204 may include a digital baseband interface to communicate with the RF circuitry 1220.

In some dual-mode embodiments, a separate radio IC circuitry may be provided for processing signals for each spectrum, although the scope of the embodiments is not limited in this respect.

In some embodiments, the synthesizer circuitry 1228 may be a fractional –N synthesizer or a fractional N/N+1 synthesizer, although the scope of the embodiments is not limited in this respect as other types of frequency synthesizers may be suitable. For example, synthesizer circuitry 1228 may be a delta-sigma synthesizer, a frequency multiplier, or a synthesizer comprising a phase-locked loop with a frequency divider.

The synthesizer circuitry 1228 may be configured to synthesize an output frequency for use by the mixer circuitry 1222 of the RF circuitry 1220 based on a frequency input and a divider control input. In some embodiments, the synthesizer circuitry 1228 may be a fractional N/N+1 synthesizer.

In some embodiments, frequency input may be provided by a voltage controlled oscillator (VCO), although that is not a requirement. Divider control input may be provided by either the baseband circuitry 1204 or the application circuitry 1202 (such as an applications processor) depending on the desired output frequency. In some embodiments, a divider control input (e.g., N) may be determined from a look-up table based on a channel indicated by the application circuitry 1202.

Synthesizer circuitry 1228 of the RF circuitry 1220 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1228 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1220 may include an IQ/polar converter.

The FEM circuitry 1230 may include a receive signal path which may include circuitry configured to operate on RF signals received from one or more antennas 1232, amplify the received signals and provide the amplified versions of the received signals to the RF circuitry 1220 for further processing. The FEM circuitry 1230 may also include a transmit signal path which may include circuitry configured to amplify signals for transmission provided by the RF circuitry 1220 for transmission by one or more of the one or more antennas 1232. In various embodiments, the amplification through the transmit or receive signal paths may be done solely in the RF circuitry 1220, solely in the FEM circuitry 1230, or in both the RF circuitry 1220 and the FEM circuitry 1230.

In some embodiments, the FEM circuitry 1230 may include a TX/RX switch to switch between transmit mode and receive mode operation. The FEM circuitry 1230 may include a receive signal path and a transmit signal path. The receive signal path of the FEM circuitry 1230 may include an LNA to amplify received RF signals and provide the amplified received RF signals as an output (e.g., to the RF circuitry 1220). The transmit signal path of the FEM circuitry 1230 may include a power amplifier (PA) to amplify input RF signals (e.g., provided by the RF circuitry 1220), and one or more filters to generate RF signals for subsequent transmission (e.g., by one or more of the one or more antennas 1232).

In some embodiments, the PMC 1234 may manage power provided to the baseband circuitry 1204. In particular, the PMC 1234 may control power-source selection, voltage scaling, battery charging, or DC-to-DC conversion. The PMC 1234 may often be included when the device 1200 is capable of being powered by a battery, for example, when the device 1200 is included in a EGE. The PMC 1234 may increase the power conversion efficiency while providing desirable implementation size and heat dissipation characteristics.

FIG. 12 shows the PMC 1234 is coupled only with the baseband circuitry 1204. However, in other embodiments, the PMC 1234 may be additionally or alternatively coupled with, and perform similar power management operations for, other components such as, but not limited to, the application circuitry 1202, the RF circuitry 1220, or the FEM circuitry 1230.

In some embodiments, the PMC 1234 may control, or otherwise be part of, various power saving mechanisms of the device 1200. For example, if the device 1200 is in an RRC Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used to execute Layer 3, Layer 2, or Layer 1 functionality, while processors of the application circuitry 1202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
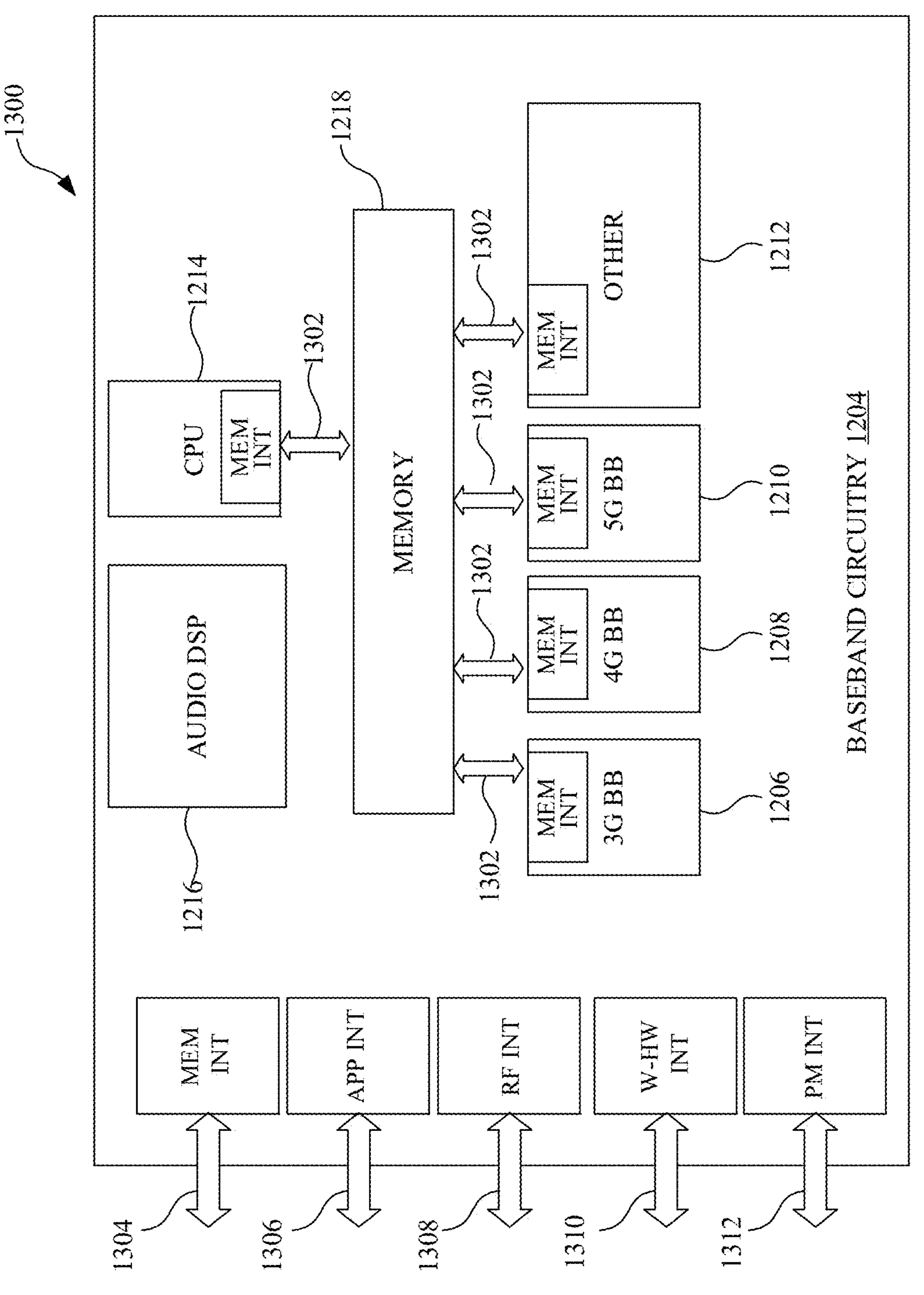
FIG. 13 illustrates exemplary interfaces of baseband circuitry in accordance with some embodiments.

FIG. 13 illustrates example interfaces 1300 of baseband circuitry in accordance with some embodiments. As discussed above, the baseband circuitry 1204 of FIG. 12 may comprise 3G baseband processor 1206, 4G baseband processor 1208, 5G baseband processor 1210, other baseband processor(s) 1212, CPU 1214, and a memory 1218 utilized by said processors. As illustrated, each of the processors may include a respective memory interface 1302 to send/receive data to/from the memory 1218.

The baseband circuitry 1204 may further include one or more interfaces to communicatively couple to other circuitries/devices, such as a memory interface 1304 (e.g., an interface to send/receive data to/from memory external to the baseband circuitry 1204), an application circuitry interface 1306 (e.g., an interface to send/receive data to/from the application circuitry 1202 of FIG. 12), an RF circuitry interface 1308 (e.g., an interface to send/receive data to/from RF circuitry 1220 of FIG. 12), a wireless hardware connectivity interface 1310 (e.g., an interface to send/receive data to/from Near Field Communication (NFC) components, Bluetooth® components (e.g., Bluetooth® Low Energy), Wi-Fi® components, and other communication components), and a power management interface 1312 (e.g., an interface to send/receive power or control signals to/from the PMC 1234.

Figure 14:
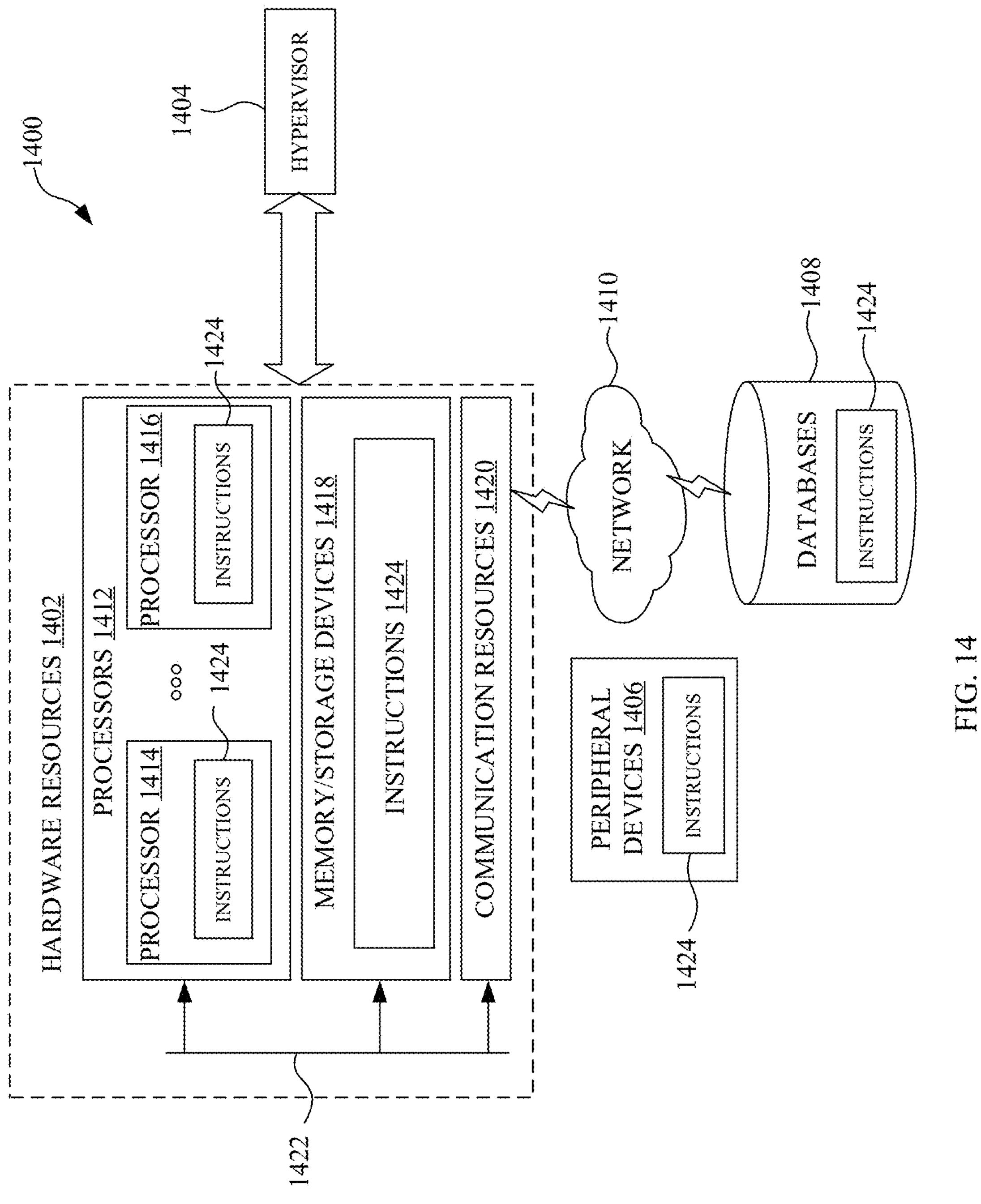
FIG. 14 illustrates components in accordance with some embodiments.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1402 including one or more processors 1412 (or processor cores), one or more memory/storage devices 1418, and one or more communication resources 1420, each of which may be communicatively coupled via a bus 1422. For embodiments where node virtualization (e.g., NFV) is utilized, a hypervisor 1404 may be executed to provide an execution environment for one or more network slices/sub-slices to utilize the hardware resources 1402.

The processors 1412 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1414 and a processor 1416.

The memory/storage devices 1418 may include main memory, disk storage, or any suitable combination thereof. The memory/storage devices 1418 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1420 may include interconnection or network interface components or other suitable devices to communicate with one or more peripheral devices 1406 or one or more databases 1408 via a network 1410. For example, the communication resources 1420 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1424 may comprise software, a program, an application, an applet, an app, or other executable code for causing at least any of the processors 1412 to perform any one or more of the methodologies discussed herein. The instructions 1424 may reside, completely or partially, within at least one of the processors 1412 (e.g., within the processor's cache memory), the memory/storage devices 1418, or any suitable combination thereof. Furthermore, any portion of the instructions 1424 may be transferred to the hardware resources 1402 from any combination of the peripheral devices 1406 or the databases 1408. Accordingly, the memory of the processors 1412, the memory/storage devices 1418, the peripheral devices 1406, and the databases 1408 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 15:
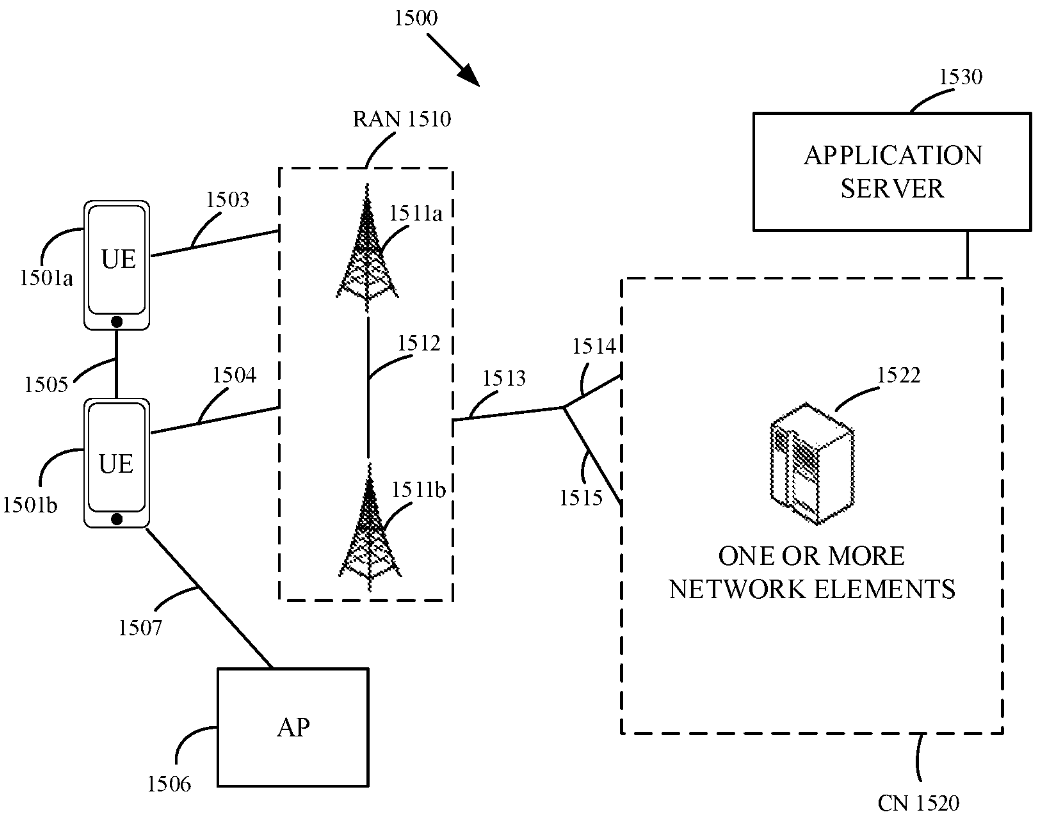
FIG. 15 illustrates an architecture of a wireless network in accordance with some embodiments.

FIG. 15 illustrates an architecture of a system 1500 of a network in accordance with some embodiments. The following description is provided for an example system 1500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems), or the like.

As shown by FIG. 15, the system 1500 includes UE 1501*a* and UE 1501*b* (collectively referred to as "UEs 1501" or "UE 1501"). The UE 1501*a* and/or UE 1501*b* may correspond to the UEs described above.

In this example, UEs 1501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1501 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1501 may be configured to connect, for example, communicatively couple, with an or RAN 1510. In embodiments, the RAN 1510 may be an NG RAN or a 5G RAN, an E-UTRAN, or a legacy RAN, such as a UTRAN or GERAN. As used herein, the term "NG RAN" or the like may refer to a RAN 1510 that operates in an NR or 5G system 1500, and the term "E-UTRAN" or the like may refer to a RAN 1510 that operates in an LTE or 4G system 1500. The UEs 1501 utilize connections (or channels) 1503 and 1504, respectively, each of which comprises a physical communications interface or layer (discussed in further detail below).

In this example, the connections 1503 and 1504 are illustrated as an air interface to enable communicative coupling, and can be consistent with cellular communications protocols, such as a GSM protocol, a CDMA network protocol, a PTT protocol, a POC protocol, a UMTS protocol, a 3 GPP LTE protocol, a 5G protocol, a NR protocol, and/or any of the other communications protocols discussed herein. In embodiments, the UEs 1501 may directly exchange communication data via a ProSe interface 1505. The ProSe interface 1505 may alternatively be referred to as a SL interface 1505 and may comprise one or more logical channels, including but not limited to a PSCCH, a PSSCH, a PSDCH, and a PSBCH.

The UE 1501*b* is shown to be configured to access an AP 1506 (also referred to as "WLAN node 1506", "WLAN 1506", "WLAN Termination 1506", "WT 1506" or the like) via connection 1507. The connection 1507 can comprise a local wireless connection, such as a connection consistent with any IEEE 802.11 protocol, wherein the AP 1506 would comprise a wireless fidelity (Wi-Fi®) router. In this example, the AP 1506 is shown to be connected to the Internet without connecting to the core network of the wireless system (described in further detail below). In various embodiments, the UE 1501*b*, RAN 1510, and AP 1506 may be configured to utilize LWA operation and/or LWIP operation. The LWA operation may involve the UE 1501*b* in RRC CONNECTED being configured by a RAN node 1511*a-b* to utilize radio resources of LTE and WLAN. LWIP operation may involve the UE 1501*b* using WLAN radio resources (e.g., connection 1507) via IPsec protocol tunneling to authenticate and encrypt packets (e.g., IP packets) sent over the connection 1507. IPsec tunneling may include encapsulating the entirety of original IP packets and adding a new packet header, thereby protecting the original header of the IP packets.

The RAN 1510 can include one or more AN nodes or RAN nodes 1511*a* and 1511*b* (collectively referred to as "RAN nodes 1511" or "RAN node 1511") that enable the connections 1503 and 1504. As used herein, the terms "access node", "access point" or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1511 that operates in an NR or 5G system 1500 (for example, a gNB), and the term "E-UTRAN node" or the like may refer to a RAN node 1511 that operates in an LTE or 4G system 1500 (e.g., an eNB). According to various embodiments, the RAN nodes 1511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1511 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1511; a MAC/PHY split wherein RRC, PDCP, RLC, and MAC layers are operated by the CRAN/vBBUP and the PHY layer is operated by individual RAN nodes 1511; or a "lower PHY" split wherein RRC, PDCP, RLC, MAC layers and upper portions of the PHY layer are operated by the CRAN/vBBUP and lower portions of the PHY layer are operated by individual RAN nodes 1511. This virtualized framework allows the freed-up processor cores of the RAN nodes 1511 to perform other virtualized applications. In some implementations, an individual RAN node 1511 may represent individual gNB-DUs that are connected to a gNB-CU via individual FI interfaces (not shown by FIG. 15). In these implementations, the gNB-DUs may include one or more remote radio heads or RFEMs, and the gNB-CU may be operated by a server that is located in the RAN 1510 (not shown) or by a server pool in a similar manner as the CRAN/vBBUP. Additionally or alternatively, one or more of the RAN nodes 1511 may be next generation eNBs (ng-eNBs), which are RAN nodes that provide E-UTRA user plane and control plane protocol terminations toward the UEs 1501, and are connected to a 5G core (5GC) via an NG interface.

In V2X scenarios one or more of the RAN nodes 1511 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1501 (vUEs 1501). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1511 can terminate the air interface protocol and can be the first point of contact for the UEs 1501. In some embodiments, any of the RAN nodes 1511 can fulfill various logical functions for the RAN 1510 including, but not limited to, radio network controller (RNC) functions such as radio bearer management, uplink and downlink dynamic radio resource management and data packet scheduling, and mobility management.

In embodiments, the UEs 1501 can be configured to communicate using OFDM communication signals with each other or with any of the RAN nodes 1511 over a multi carrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1511 to the UEs 1501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1501 and the RAN nodes 1511 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 1501 and the RAN nodes 1511 may operate using LAA, eLAA, and/or feLAA mechanisms. In these implementations, the UEs 1501 and the RAN nodes 1511 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1501, RAN nodes 1511 etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1501, AP 1506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (ps); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1501 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1501. The PDCCH carries information about the transport format and resource allocations related to the PDSCH channel, among other things. It may also inform the UEs 1501 about the transport format, resource allocation, and HARQ information related to the uplink shared channel. Typically, downlink scheduling (assigning control and shared channel resource blocks to the UE 1501*b* within a cell) may be performed at any of the RAN nodes 1511 based on channel quality information fed back from any of the UEs 1501. The downlink resource assignment information may be sent on the PDCCH used for (e.g., assigned to) each of the UEs 1501.

The PDCCH uses control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to six resource element groups (REGs). Each REG comprises one resource block in one OFDM symbol. The PDCCH can be transmitted using one or more CCEs, depending on the size of the downlink control information (DCI) and the channel condition. Different numbers of CCEs (e.g., aggregation level, L=1, 2, 4, 8 or 16) can be used for transmission of the PDCCH.

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 1511 may be configured to communicate with one another via interface 1512. In embodiments where the system 1500 is an LTE system (e.g., when CN 1520 is an EPC), the interface 1512 may be an X2 interface 1512. The X2 interface may be defined between two or more RAN nodes 1511 (e.g., two or more eNBs and the like) that connect to EPC 1520, and/or between two eNBs connecting to EPC 1520. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1501 from an SeNB for user data; information of PDCP PDUs that were not delivered to a UE 1501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality. In embodiments where the system 1500 is a 5G or NR system (e.g., when CN 1520 is an 5GC), the interface 1512 may be an Xn interface 1512. The Xn interface is defined between two or more RAN nodes 1511 (e.g., two or more gNBs and the like) that connect to 5GC 1520, between a RAN node 1511 (e.g., a gNB) connecting to 5GC 1520 and an eNB, and/or between two eNBs connecting to 5GC 1520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1501 in a connected mode (e.g., CM-CONNECTED) including functionality to manage the UE mobility for connected mode between one or more RAN nodes 1511. The mobility support may include context transfer from an old (source) serving RAN node 1511 to new (target) serving RAN node 1511; and control of user plane tunnels between old (source) serving RAN node 1511 to new (target) serving RAN node 1511. A protocol stack of the Xn-U may include a transport network layer built on Internet Protocol (IP) transport layer, and a GTP—U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1510 is shown to be communicatively coupled to a core network—in this embodiment, core network (CN) 1520. The CN 1520 may comprise a plurality of network elements 1522, which are configured to offer various data and telecommunications services to customers/subscribers (e.g., users of UEs 1501) who are connected to the CN 1520 via the RAN 1510. The components of the CN 1520 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1520 may be referred to as a network slice, and a logical instantiation of a portion of the CN 1520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1530 may be an element offering applications that use IP bearer resources with the core network (e.g., UMTS PS domain, LTE PS data services, etc.). The application server 1530 can also be configured to support one or more communication services (e.g., VoIP sessions, PTT sessions, group communication sessions, social networking services, etc.) for the UEs 1501 via the EPC 1520.

In embodiments, the CN 1520 may be a 5GC (referred to as "5GC 1520" or the like), and the RAN 1510 may be connected with the CN 1520 via an NG interface 1513. In embodiments, the NG interface 1513 may be split into two parts, an NG user plane (NG-U) interface 1514, which carries traffic data between the RAN nodes 1511 and a UPF, and the SI control plane (NG-C) interface 1515, which is a signaling interface between the RAN nodes 1511 and AMFs.

In embodiments, the CN 1520 may be a 5G CN (referred to as "5GC 1520" or the like), while in other embodiments, the CN 1520 may be an EPC). Where CN 1520 is an EPC (referred to as "EPC 1520" or the like), the RAN 1510 may be connected with the CN 1520 via an SI interface 1513. In embodiments, the SI interface 1513 may be split into two parts, an SI user plane (S1-U) interface 1514, which carries traffic data between the RAN nodes 1511 and the S-GW, and the S1-MME interface 1515, which is a signaling interface between the RAN nodes 1511 and MMEs.

ADDITIONAL EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), comprising: receiving a downlink control information (DCI) that indicates a physical uplink control channel (PUCCH) occasion retransmission; and performing retransmission for the PUCCH occasion and HARQ-ACK codebook associated with the PUCCH occasion based on the received DCI.

Example 2 is the method of example 1, wherein the DCI includes a PUCCH slot indicator (PSI) field, a one-shot hybrid automatic repeat request (HARQ) acknowledgement (HARQ-ACK) request field and a PUCCH priority indicator (PPI) field.

Example 3 is the method of example 2, wherein the value of PSI field is one-to-one mapping to values of parameter $K_3$ that is configured by radio resource control (RRC) signaling.

Example 4 is the method of example 3, wherein a bit width for the PSI field is determined as $\lceil \log_2(I) \rceil$, where I represents the number of the $K_3$ parameter values configured by RRC signaling.

Example 5 is the method of example 3, wherein a plurality of the PSI fields are included in the DCI to support a plurality of the PUCCH occasion retransmissions that are triggered by a DCI.

Example 6 is the method of example 2, wherein the PSI field is formed as a I-bit bitmap, where I represents the number of $K_3$ parameter values, and each bit in the I-bit bitmap corresponds to one of the values of $K_3$ parameter.

Example 7 is the method of any of examples 3 to 6, wherein the performing the PUCCH occasion retransmission based on the DCI comprises: upon detection of a DCI in a slot n that triggers a PUCCH occasion retransmission, where n represents an index of the slot, performing retransmissions for the PUCCH occasion indicated by the DCI and the corresponding HARQ-ACK codebook (CB) transmitted on the PUCCH occasion in a slot n-$K_3$ where $K_3$ is indicated by the DCI.

Example 8 is the method of any of examples 3 to 6, wherein the performing the PUCCH occasion retransmission based on the DCI comprises: performing the PUCCH occasion retransmission in a target PUCCH occasion, to which an initial PUCCH occasion for the PUCCH occasion retransmission has a slot gap corresponding to the value of $K_3$.

Example 9 is the method of example 2, wherein the one-shot HARQ-ACK request field is set to 1-bit and used to trigger a retransmission for the HARQ-ACK CB carried on the retransmitted PUCCH occasion indicated by the DCI.

Example 10 is the method of example 2, wherein the PPI field is set to 1-bit.

Example 11 is the method of example 2, wherein the PPI field is configured to indicate a priority of a retransmitted PUCCH.

Example 12 is the method of example 1, wherein a priority of a retransmitted PUCCH occasion is appended to a predefined location of a retransmitted HARQ-ACK payload.

Example 13 is the method of any of examples 3 to 6, wherein the performing the PUCCH occasion retransmission based on the DCI comprises: upon detection of a triggering in a slot n indicating to perform the PUCCH occasion retransmission for the PUCCH in a slot n-$K_3$, where n represents an index of the slot, discarding an HARQ-ACK CB that is transmitted in a slot earlier than the slot n-$K_3$.

Example 14 is the method of example 1, wherein the PUCCH occasion retransmission is associated with a Type 2 HARQ-ACK CB, and the DCI includes a counter downlink assignment indicator (C-DAI) field and a total downlink assignment indicator (T-DAI) field.

Example 15 is the method of example 14, wherein the C-DAI field and the T-DAI field in the DCI triggering a PUCCH occasion retransmission are continuously accumulated based on the value of C-DAI field and the value of T-DAI field in the last DCI that is associated with the retransmitted PUCCH occasion.

Example 16 is the method of example 14, wherein the C-DAI field and the T-DAI field in the DCI triggering a PUCCH occasion retransmission are reset and counted independently, regardless of values of the C-DAI field and the T-DAI field in the last DCI of a retransmitted PUCCH.

Example 17 is the method of example 16, wherein an additional T-DAI field is added to the DCI that triggers a PUCCH occasion retransmission to indicate the size of a retransmitted HARQ-ACK.

Example 18 is the method of example 1, wherein the PUCCH occasion retransmission is associated with a Type 1 HARQ-ACK CB.

Example 19 is the method of example 18, wherein the performing the PUCCH occasion retransmission comprises: appending an HARQ-ACK CB that is retransmitted in a slot n at the end of an initial HARQ-ACK CB that is associated with the slot n, according to a set of K1 values configured by RRC, where n represents an index of the slot.

Example 20 is the method of example 18, wherein the performing the PUCCH occasion retransmission comprises: excluding a duplicated HARQ-ACK bit existed in both an original HARQ-ACK CB and a retransmitted HARQ-ACK CB that is associated with a same DL slot index; and concatenating the original HARQ-ACK CB with the retransmitted HARQ-ACK CB.

Example 21 is the method of example 18, the performing the PUCCH occasion retransmission comprises: transmitting a retransmitted HARQ-ACK CB on a PUCCH occasion indicated by the DCI that triggers a PUCCH occasion retransmission.

Example 22 is a method for a base station, comprising: constructing, a downlink control information (DCI) that indicates a physical uplink control channel (PUCCH) occasion retransmission for the UE; and providing the DCI for the UE to trigger the PUCCH occasion retransmission.

Example 23 is the method of example 22, wherein the DCI includes a PUCCH slot indicator (PSI) field, a one-shot hybrid automatic repeat request (HARQ) acknowledgement (HARQ-ACK) request field and a PUCCH priority indicator (PPI) field.

Example 24 is the method of example 23, wherein the value of PSI field is one-to-one mapping to values of parameter $K_3$ that is configured by radio resource control (RRC) signaling.

Example 25 is the method of example 24, wherein a bit width for the PSI field is determined as $\lceil \log_2(I) \rceil$, where I represents the number of the $K_3$ parameter values configured by RRC signaling.

Example 26 is the method of example 24, wherein a plurality of the PSI fields are included in the DCI to support a plurality of the PUCCH occasion retransmissions that are triggered by a DCI.

Example 27 is the method of example 23, wherein the PSI field is formed as a I-bit bitmap, where I represents the number of $K_3$ parameter values, and each bit in the I-bit bitmap corresponds to one of the values of $K_3$ parameter.

Example 28 is the method of example 23, wherein the one-shot HARQ-ACK request field is set to 1-bit and used to trigger a retransmission for the HARQ-ACK CB carried on the retransmitted PUCCH occasion indicated by the DCI.

Example 29 is the method of example 23, wherein the PPI field is set to 1-bit.

Example 30 is the method of example 23, wherein the PPI field is configured to indicate a priority of a retransmitted PUCCH.

Example 31 is the method of example 22, wherein the PUCCH occasion retransmission is associated with a Type 2 HARQ-ACK CB, and the DCI includes a counter downlink assignment indicator (C-DAI) field and a total downlink assignment indicator (T-DAI) field.

Example 32 is the method of example 31, wherein the providing the DCI for performing the PUCCH occasion retransmission comprises: continuously accumulating the C-DAI field and the T-DAI field in the DCI triggering a PUCCH occasion retransmission based on the value of C-DAI field and the value of T-DAI field in the last DCI that is associated with a retransmitted PUCCH.

Example 33 is the method of example 31, wherein the providing the DCI for performing the PUCCH occasion retransmission comprises: resetting and counting the C-DAI field and the T-DAI field in the DCI triggering a PUCCH occasion retransmission independently, regardless of values of the C-DAI field and the T-DAI field in the last DCI of a retransmitted PUCCH.

Example 34 is the method of example 33, wherein the providing the DCI for performing the PUCCH occasion retransmission further comprises: adding an additional T-DAI field to the DCI that triggers a PUCCH occasion retransmission to indicate the size of a retransmitted HARQ-ACK.

Example 35 is an apparatus for a user equipment (UE), comprising: one or more processors configured to perform the method according to any of examples 1-21.

Example 36 is an apparatus for a based station, comprising: one or more processors configured to perform the method according to any of examples 22-34.

Example 37 is a computer readable medium having computer programs stored thereon which, when executed by one or more processors, cause an apparatus to perform the method according to any of examples 1-34.

Example 38 is an apparatus for a communication device, comprising means for performing the method according to any of examples 1-34.

Example 39 is a computer program product comprising computer programs which, when executed by one or more processors, cause an apparatus to perform the method according to any of examples 1-34.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus comprising:
processor circuitry to:
detect, in a first slot having an index n, downlink control information (DCI) that indicates retransmission of a physical uplink control channel (PUCCH) occasion associated with a second slot having an index n-$K_3$, wherein $K_3$ is indicated by the DCI and the DCI further includes a PUCCH slot indicator (PSI) field, a one-shot HARQ-ACK request field, and a PUCCH priority indicator (PPI) field;
generate, based upon detection of the DCI in the first slot, a hybrid automatic repeat request-acknowledgment (HARQ-ACK) codebook associated with the PUCCH occasion;
detect a priority associated with the HARQ-ACK codebook; and
discard, based on detection of the priority, HARQ-ACK feedback for physical downlink shared channel (PDSCH) transmissions transmitted in slots earlier than the second slot; and
output the HARQ-ACK codebook for transmission; and
interface circuitry coupled with the processor circuitry to enable communication.

2. The apparatus of claim 1, wherein a value of the PSI field is one-to-one mapped to a value of parameter $K_3$ that is configured by radio resource control (RRC) signaling.

3. The apparatus of claim 2, wherein a bit width for the PSI field is determined as $[\log_2(I)]$, where I represents a number of the $K_3$ parameter values configured by the RRC signaling.

4. The apparatus of claim 2, wherein a plurality of the PSI fields are included in the DCI to support a plurality of PUCCH occasion retransmissions that are triggered by the DCI.

5. The apparatus of claim 2, wherein the processor circuitry is to:
generate the HARQ-ACK codebook for transmission in a target PUCCH occasion to which the PUCCH occasion has a slot gap corresponding to the value of $K_3$.

6. The apparatus of claim 1, wherein the PSI field is formed as a I-bit bitmap, where I represents a number of $K_3$ parameter values, and each bit in the I-bit bitmap corresponds to one of the $K_3$ parameter values.

7. The apparatus of claim 1, wherein the one-shot HARQ-ACK request field is to trigger the retransmission of the PUCCH occasion.

8. The apparatus of claim 1, wherein the PPI field is to indicate the priority of the HARQ-ACK codebook.

9. A method comprising:
detecting, in a first slot having an index n, downlink control information (DCI) that indicates retransmission of a physical uplink control channel (PUCCH) occasion associated with a second slot having an index n-$K_3$, wherein $K_3$ is indicated by the DCI and the DCI further includes a PUCCH slot indicator (PSI) field, a one-shot HARQ-ACK request field, and a PUCCH priority indicator (PPI) field;
generating, based upon detecting the DCI in the first slot, a hybrid automatic repeat request-acknowledgment (HARQ-ACK) codebook associated with the PUCCH occasion;
detecting a priority associated with the HARQ-ACK codebook; and
discarding, based on detecting the priority, HARQ-ACK feedback for physical downlink shared channel (PDSCH) transmissions transmitted in slots earlier than the second slot; and
outputting the HARQ-ACK codebook for transmission.

10. The method of claim 9, wherein a value of the PSI field is one-to-one mapped to a value of parameter $K_3$ that is configured by radio resource control (RRC) signaling.

11. The method of claim 10, wherein a bit width for the PSI field is determined as $[\log_2(I)]$, where I represents a number of the $K_3$ parameter values configured by the RRC signaling.

12. The method of claim 10, wherein a plurality of the PSI fields are included in the DCI to support a plurality of PUCCH occasion retransmissions that are triggered by the DCI.

13. The method of claim 10, further comprising:
generating the HARQ-ACK codebook for transmission in a target PUCCH occasion to which the PUCCH occasion has a slot gap corresponding to the value of $K_3$.

14. The method of claim 9, wherein the PSI field is formed as a I-bit bitmap, where I represents a number of $K_3$ parameter values, and each bit in the I-bit bitmap corresponds to one of the $K_3$ parameter values.

15. The method of claim 9, wherein the one-shot HARQ-ACK request field is to trigger the retransmission of the PUCCH occasion.

16. The method of claim 9, wherein the PPI field is to indicate the priority of the HARQ-ACK codebook.

17. A method comprising:
receiving downlink control information (DCI) that indicates retransmission of a physical uplink control channel (PUCCH) occasion; and
generating, for transmission, a hybrid automatic repeat request-acknowledgment (HARQ-ACK) codebook associated with the PUCCH occasion based on the DCI,
wherein: the DCI includes a PUCCH slot indicator (PSI) field, a one-shot HARQ-ACK request field, and a PUCCH priority indicator (PPI) field; a value of the PSI field is one-to-one mapped to a value of parameter $K_3$ that is configured by radio resource control (RRC) signaling; and a bit width for the PSI field is determined as $[\log_2(I)]$, where I represents a number of the $K_3$ parameter values configured by the RRC signaling.

18. The method of claim 17, wherein a plurality of the PSI fields are included in the DCI to support a plurality of PUCCH occasion retransmissions that are triggered by the DCI.

19. The method of claim 17, further comprising:
upon detecting the DCI in a first slot having an index n, identifying the HARQ-ACK codebook associated with the PUCCH occasion from a second slot having an index n-$K_3$ where $K_3$ is indicated by the DCI.

20. The method of claim 19, further comprising:
detecting a priority associated with the HARQ-ACK codebook; and
discarding, based on detecting the priority, HARQ-ACK feedback for physical downlink shared channel (PDSCH) transmissions transmitted in slots earlier than the second slot.

21. The method of claim 17, further comprising:

generating the HARQ-ACK codebook for transmission in a target PUCCH occasion to which the PUCCH occasion has a slot gap corresponding to the value of $K_3$.

22. The method of claim 17, wherein the PSI field is formed as a I-bit bitmap, where/represents a number of $K_3$ parameter values, and each bit in the I-bit bitmap corresponds to one of the $K_3$ parameter values.

23. The method of claim 17, wherein the one-shot HARQ-ACK request field is to trigger the retransmission of the PUCCH occasion.

24. The method of claim 17, wherein the PPI field is to indicate a priority of the HARQ-ACK codebook.

* * * * *